Dec. 22, 1959   W. G. LANEY   2,918,244
CLIP
Filed April 6, 1959
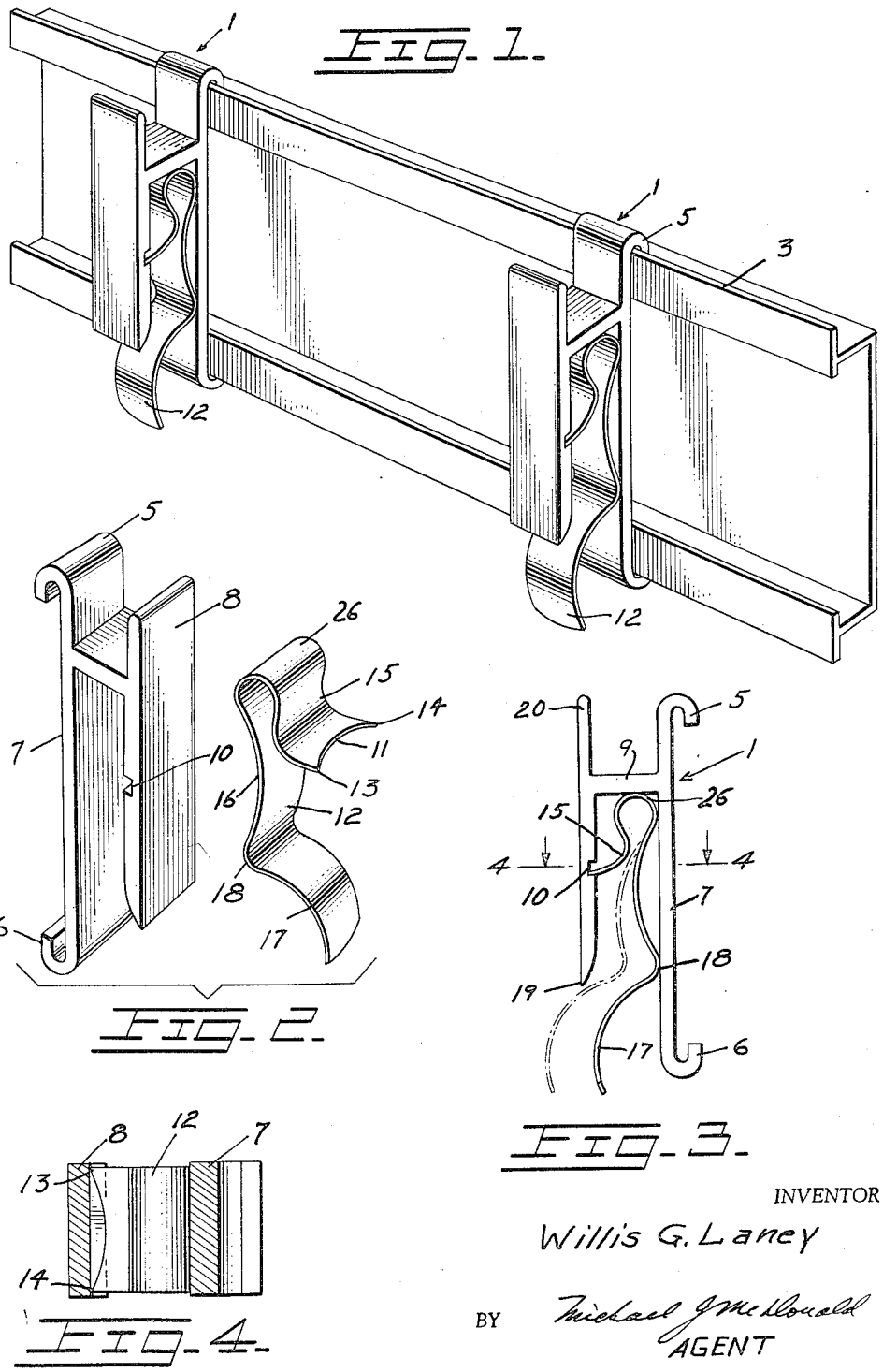
INVENTOR
Willis G. Laney
BY Michael J McDonald
AGENT

United States Patent Office 2,918,244
Patented Dec. 22, 1959

2,918,244
CLIP

Willis G. Laney, Ontario, Calif., assignor to Bestile Manufacturing Company, Ontario, Calif., a corporation of California Application April 6, 1959, Serial No. 804,444

7 Claims. (Cl. 248—214)

My invention relates to a new and useful clip for hanging maps, charts or other visual material for display.

An object of my invention is to provide a clip which can be fabricated at low cost without the use of bolts, screws, rivets or welds.

A further object of my invention is to provide a clip having a spring which will retain its original tension and is not easily damaged by misuse or vandalism.

Other objects and advantages will appear on reference to the accompanying specification and drawing in which:

Fig. 1 is a perspective view showing two clips mounted on a rail;

Fig. 2 is an exploded perspective view showing the clip body with spring removed;

Fig. 3 is a side view; and

Fig. 4 is a section taken on line 4—4 of Fig. 3.

My clip 1 may be provided with suitable screw holes or other means to secure it to a wall. I prefer, however, to provide a supporting rail 2 which may be attached to a wall to slidably support one or more clips. The rail is formed with flanges 3 and 4 which slidably receive ears 5 and 6 formed on the extremities of the rear leg 7 of my clip.

As best seen in Fig. 3 my clip is generally H shaped in section and is composed of a rear leg 7 and a front leg 8 connected by cross member 9. The front leg is provided with a groove 10 in which one end 11 of a leaf spring 12 is positioned. As shown in Fig. 4, the end 11 of the spring is arcuately cut to form sharp prongs 13 and 14 which dig into the metal at groove 10 to assist in retaining the spring against displacement. The spring curves upwardly at 15, is doubled back to form loop 26 and arched at 16 and 17 to form a clamping portion 18 which engages the surface of rear leg 7. The spring is of such size that upon being compressed it can be tightly positioned within the confines of legs 7 and 8 below the cross member 9 as shown in Fig. 3. The spring is thus held in place with loop 26 contacting both the cross member and the rear leg. The lower arched portion 17 of the spring serves as a convenient finger hold for lifting the spring out of contact with the rear leg at 18 to permit positioning or removing a map or other display piece.

The lower end 19 of front leg 8 serves as a stop to restrict the extent of movement of spring 12 as shown in dotted lines in Fig. 3, thus preventing damage that would result if the spring were free to move beyond its elastic limit. The upper end 20 of front leg 8 serves as a convenient hook to support articles by means of rings, wire, map rod or other similar means.

In use, rails 2 are mounted on one or more walls of a room at a suitable height. In a classroom this would normally be just above the blackboard. Each rail is provided with a plurality of clips which can be slid along the rail to any point desired to provide support for many types of visual display material. The material may be supported by clamping it under the spring or by employing the clip as a hook.

It is to be understood that the preferred embodiment as disclosed herein may be modified within the scope of the invention as set forth in the appended claims.

I claim:

1. A clip having a front leg and a rear leg connected by a cross member, the front leg being provided with a groove, a leaf spring having one end supported in said groove, a looped portion contacting the rear leg and cross member and a clamping portion normally in contact with said rear leg.

2. A clip as recited in claim 1 wherein the end of the spring in said groove is formed with retaining prongs.

3. A clip is recited in claim 1 in which the front leg extends downwardly to limit the forward movement of the spring.

4. A clip as recited in claim 1 in which the front leg extends above the cross member to provide a hook.

5. A clip as recited in claim 1 in which the rear leg is provided with ears to slidably engage a supporting rail.

6. A clip of generally H shaped section having a front leg, a rear leg and a cross member, means on the rear leg for receiving a supporting rail, a spring positioned between the legs of the H member, the front leg extending downwardly to provide a limit stop for the spring and extending upwardly to provide a hook.

7. A clip of generally H shaped section having a front leg, a rear leg and a cross member, a leaf spring mounted between the legs of the H below the cross member, the front leg extending downwardly to form a limit stop for the spring.

References Cited in the file of this patent
UNITED STATES PATENTS

| | | |
|---|---|---|
| 1,739,057 | Bock | Dec. 10, 1929 |
| 1,758,292 | Meyer | May 13, 1930 |
| 1,801,027 | Toner | Apr. 14, 1931 |

FOREIGN PATENTS

| | | |
|---|---|---|
| 842,391 | Germany | June 26, 1952 |